United States Patent
Gotoh et al.

(10) Patent No.: US 11,912,276 B2
(45) Date of Patent: Feb. 27, 2024

(54) INFORMATION PROCESSING APPARATUS, INFORMATION PROCESSING METHOD, AND STORAGE MEDIUM

(71) Applicant: TOYOTA JIDOSHA KABUSHIKI KAISHA, Toyota (JP)

(72) Inventors: Hikaru Gotoh, Nagoya (JP); Shin Sakurada, Toyota (JP); Naoki Uenoyama, Nagoya (JP); Takumi Fukunaga, Nisshin (JP); Josuke Yamane, Nisshin (JP); Rio Minagawa, Nagoya (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 340 days.

(21) Appl. No.: 17/155,374

(22) Filed: Jan. 22, 2021

(65) Prior Publication Data
US 2021/0253099 A1    Aug. 19, 2021

(30) Foreign Application Priority Data
Feb. 18, 2020 (JP) .................................. 2020-025490

(51) Int. Cl.
| | |
|---|---|
| *B60W 30/16* | (2020.01) |
| *B60W 30/14* | (2006.01) |
| *B60W 40/04* | (2006.01) |
| *B60W 40/105* | (2012.01) |

(52) U.S. Cl.
CPC ........ *B60W 30/162* (2013.01); *B60W 30/146* (2013.01); *B60W 40/04* (2013.01); *B60W 40/105* (2013.01); *B60W 2554/4046* (2020.02); *B60W 2554/804* (2020.02)

(58) Field of Classification Search
CPC .... B60W 40/04; B60W 40/09; B60W 40/105; B60W 50/14
See application file for complete search history.

(56) References Cited

U.S. PATENT DOCUMENTS

| | | | |
|---|---|---|---|
| 2005/0240335 A1* | 10/2005 | Schroder ......... | B60W 30/18145 180/170 |
| 2017/0106876 A1* | 4/2017 | Gordon ............ | B60W 60/0051 |
| 2018/0197415 A1 | 7/2018 | Kurata | |
| 2019/0102689 A1* | 4/2019 | Lassoued ............ | G07C 5/0841 |
| 2019/0286133 A1* | 9/2019 | Bielby ............... | B60W 50/082 |
| 2019/0377354 A1* | 12/2019 | Shalev-Shwartz ... | G05D 1/0278 |

FOREIGN PATENT DOCUMENTS

| | | |
|---|---|---|
| JP | 2015-28672 A | 2/2015 |
| JP | 2018-112892 A | 7/2018 |
| JP | 2018-180727 A | 11/2018 |
| JP | 2019-119371 A | 7/2019 |
| WO | WO-2020230683 A1 * | 11/2020 |

* cited by examiner

*Primary Examiner* — Peter D Nolan
*Assistant Examiner* — Ce Li Li
(74) *Attorney, Agent, or Firm* — Oblon, McClelland, Maier & Neustadt, L.L.P.

(57) ABSTRACT

An information processing apparatus comprises a controller configured to execute periodically acquiring relative speed between two vehicles which are traveling on a same road; and performing predetermined processing in a case where a number of times that polarity of the relative speed is inverted in a first period exceeds a first threshold.

17 Claims, 9 Drawing Sheets

VEHICLE
(IN-VEHICLE DEVICE 100)

| FIRST THRESHOLD | SECOND THRESHOLD | THIRD THRESHOLD |
|---|---|---|
| 5 TIMES/ 30 SECONDS | 20m | 10 km/h/ 2 SECONDS |

FIG. 3B

| TYPE OF ROAD | FIRST THRESHOLD | SECOND THRESHOLD | THIRD THRESHOLD |
|---|---|---|---|
| GENERAL ROAD | 4 TIMES/ 30 SECONDS | 10m | 10 km/h/ 2 SECONDS |
| LIMITED HIGHWAY | 5 TIMES/ 30 SECONDS | 15m | 15 km/h/ 2 SECONDS |
| EXPRESSWAY | 5 TIMES/ 30 SECONDS | 30m | 20 km/h/ 2 SECONDS |
| ... | ... | ... | ... |

INFORMATION PROCESSING APPARATUS, INFORMATION PROCESSING METHOD, AND STORAGE MEDIUM

CROSS REFERENCE TO THE RELATED APPLICATION

This application claims the benefit of Japanese Patent Application No. 2020-025490, filed on Feb. 18, 2020, which is hereby incorporated by reference herein in its entirety.

BACKGROUND

Technical Field

The present disclosure relates to a technique for securing traffic safety.

Description of the Related Art

There is a system for supporting safe driving. For example, Patent document 1 discloses a driving evaluation system which detects an event on the basis of vehicle speed and a distance between vehicles obtained through sensing.

Citation List

Patent document 1: Japanese Patent Laid-Open No. 2018-180727

SUMMARY

In a case where an event is detected on the basis of vehicle speed and a distance between vehicles, it is difficult to discern whether a vehicle simply follows a preceding vehicle closely or a vehicle maliciously tailgates a preceding vehicle.

The present disclosure has been made in view of the above-described problem and is directed to detecting occurrence of road rage on a road with high accuracy.

The present disclosure in its one aspect provides an information processing apparatus comprising a controller configured to execute: periodically acquiring relative speed between two vehicles which are traveling on a same road; and performing predetermined processing in a case where a number of times that polarity of the relative speed is inverted in a first period exceeds a first threshold.

The present disclosure in its another aspect provides an information processing method comprising: a step of periodically acquiring relative speed between two vehicles which are traveling on a same road; and a step of performing predetermined processing in a case where a number of times that polarity of the relative speed is inverted in a first period exceeds a first threshold.

Further, as another aspect, a program for causing a computer to execute the information processing method to be executed by the above-described information processing apparatus, or a computer-readable storage medium which non-transitorily stores the program is provided.

According to the present disclosure, it is possible to detect occurrence of road rage on a road with high accuracy.

DESCRIPTION OF THE EMBODIMENTS

In recent years, with toughening of penalties for dangerous driving including road rage as background, a number of techniques for safe driving have been proposed. For example, there is an apparatus which monitors a distance between a vehicle and a preceding vehicle and determines that road rage occurs in a case where the distance between the vehicles becomes equal to or less than a predetermined value at predetermined speed or higher.

However, according to the determination method, even in a case where a distance between the vehicles transitorily becomes small for some reason, there is a case where it is determined that road rage has occurred. To determine whether or not an action is road rage, it is preferable to perform determination on the basis of continuity of the action.

An information processing apparatus according to the embodiments includes a controller configured to periodically acquire relative speed between two vehicles which are traveling on the same road, and perform predetermined processing in a case where the number of times that polarity of the relative speed is inverted in a first period exceeds a first threshold.

The information processing apparatus may be mounted on one (or both) of the two vehicles or may be provided outside the vehicle. The apparatus acquires relative speed between the two vehicles and calculates the number of times that polarity (plus and minus signs) of the relative speed is inverted in a predetermined period. Then, in a case where the number of times exceeds a threshold, the apparatus determines that road rage has occurred and performs predetermined processing.

In a case where polarity inversion of the relative speed continuously occurs, it means that behavior of one vehicle approaching and moving away from the other vehicle is continuing. Therefore, by calculating the number of times the sign is inverted, it is possible to determine that an undesirable driving action is continuously performed, so that it is possible to estimate occurrence of road rage with high accuracy.

Note that the predetermined processing only requires to be processing of taking some kind of measures against road rage. For example, the predetermined processing may be processing of issuing an alert to a party who has performed road rage or may be processing of providing support to a party who has been subjected to the road rage.

For example, to evacuate the vehicle which has been subjected to road rage, driving of the vehicle may be switched from manual driving to automated driving. Further, a method for taking measures against road rage may be introduced through visual information or speech. Further, a message indicating that driving support or automated driving will be started may be provided.

Further, to stop road rage, driving of the vehicle which has performed road rage may be switched from manual driving to automated driving.

Note that, in the present disclosure, road rage indicates a driving action which causes traffic danger to another vehicle and is not limited to an action of approaching from behind (tailgating). For example, the road rage includes coming close from a side, traveling hindrance of cutting in front of the vehicle, or the like.

Further, the controller may further acquire a relative distance between the two vehicles and may perform the predetermined processing in a case where the relative distance falls below a second threshold.

By performing the processing described above only in a case where a distance between the vehicles is not sufficient, it is possible to prevent erroneous determination.

Further, the controller may determine the second threshold on the basis of a traveling environment of the two vehicles. Further, the controller may determine the second threshold on the basis of vehicle speed of the two vehicles.

The threshold for the relative distance to be used upon determination is preferably changed in accordance with the traveling environment. For example, in a case where the traveling environment is an expressway or a traveling environment in which speed is high, the second threshold may be set greater, while, in a case where the traveling environment is a traveling environment in which speed is low, the second threshold may be set smaller. According to such a configuration, it becomes possible to perform appropriate determination in accordance with the traveling environment. Note that the traveling environment may indicate a type of the road or may indicate a speed range. Further, the traveling environment may indicate weather or brightness.

Further, the controller may acquire a maximum value and a minimum value of vehicle speed in a second period for each of the two vehicles.

Further, the controller may determine that road rage occurs by a vehicle for which a difference between the maximum value and the minimum value is greater, with respect to the other vehicle.

The vehicle which is performing road rage has a feature that vehicle speed drastically changes in a short period of time. Therefore, for example, by acquiring the maximum value and the minimum value of the vehicle speed in the last several seconds, it is possible to estimate which of the two vehicles is performing road rage.

Note that a length of the second period may be the same as or different from the period described above.

Further, the controller may issue an alert to a driver of the vehicle which has performed the road rage as the predetermined processing.

By transmitting a message that the road rage is being observed, suppression of the action can be expected.

Further, the controller may perform the predetermined processing in a case where a change amount of the vehicle speed in a third period exceeds a third threshold for one of the vehicles.

For example, in a case where a change amount of the vehicle speed in the last several seconds exceeds the third threshold, it may be determined that road rage has occurred regardless of transition of the relative speed, because it can be regarded as sudden braking, or the like, being performed in the vicinity of the other vehicle.

Note that a length of the third period may be the same as or different from the period described above.

Further, the controller may determine the first threshold on the basis of positional relationship between the two vehicles.

Further, the controller may set the first threshold smaller in a case where the two vehicles are traveling side by side than in a case where the two vehicles are traveling in single file.

In a case where the relative speed repeatedly changes in a state where the two vehicles are traveling side by side, it can be estimated that the vehicle is coming close from a side. Because an action of coming close from a side is more dangerous than road rage from behind, by setting the first threshold smaller, it is possible to improve detection sensitivity.

Further, the information processing apparatus is an apparatus which is mounted on one of the two vehicles, and the controller may calculate the relative speed on the basis of a result of sensing another vehicle located in the vicinity of the own vehicle.

Sensing does not necessarily have to be performed by the own vehicle. For example, sensor data acquired by a vehicle other than the own vehicle, a roadside device, or the like, may be indirectly acquired. Further, a vehicle other than the own vehicle may be the other vehicle itself which is a sensing target.

Further, the controller may generate a plurality of pairs of the own vehicle and another vehicle and may calculate the relative speed for each of the pairs.

By calculating the relative speed for each of the vehicles, even in a case where there is a plurality of other vehicles in the vicinity of the own vehicle, it is possible to detect road rage.

Further, the second processing may be performed on the basis of the number of times that the predetermined processing has been performed.

According to such a configuration, in a case where determination of road rage has been accumulated, it is possible to take a different action.

Embodiments of the present disclosure will be described below on the basis of the drawings. The following configurations of the embodiments are examples, and the present disclosure is not limited to the configurations of the embodiments.

(First embodiment)

Figure 1:
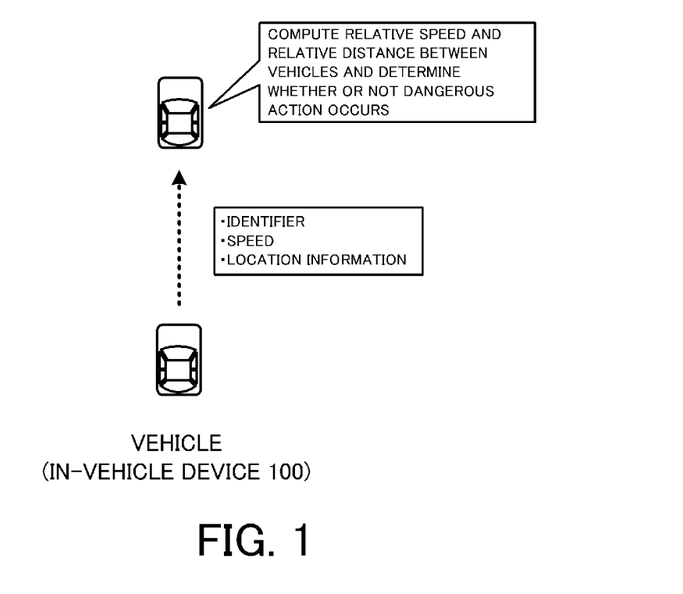
FIG. 1 is an overview diagram of a vehicle system according to a first embodiment.

Outline of a vehicle system according to a first embodiment will be described with reference to FIG. 1. The vehicle system according to the present embodiment includes in-vehicle devices 100 mounted on a plurality of vehicles.

The in-vehicle device 100 is a computer mounted on a vehicle. The in-vehicle device 100 periodically acquires speed and location information of the own vehicle and exchanges information with the in-vehicle device 100 mounted on the other vehicle. The in-vehicle device 100 may be a device fixed at the vehicle or may be a mobile terminal, or the like, possessed by a person who is on board the vehicle.

Further, the in-vehicle device 100 acquires change of a relative distance and relative speed between the own vehicle and the other vehicle on the basis of the exchanged information and determines whether or not a dangerous action including road rage occurs between the own vehicle and the other vehicle.

Figure 2:
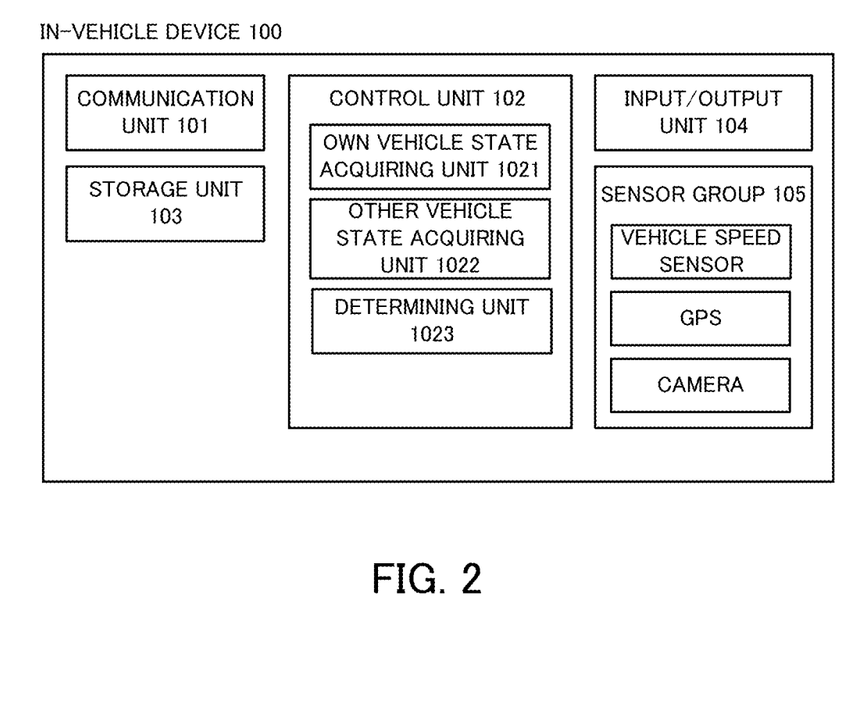
FIG. 2 is a system configuration diagram of an in-vehicle device according to the first embodiment.

Components of the system will be described next with reference to FIG. 2.

The in-vehicle device 100 may be configured with a general-purpose computer. That is, the in-vehicle device 100 can be configured as a computer including a processor such as a CPU and a GPU, a main memory such as a RAM and a ROM, and an auxiliary memory such as an EPROM, a hard disk drive and a removable medium. Note that the removable medium may be, for example, a USB memory or a disk recording medium such as a CD and a DVD. An operating system (OS), various kinds of programs, various kinds of tables, or the like, are stored in the auxiliary memory, and by the programs stored therein being loaded to a work area of the main memory and executed, and respective components, or the like, being controlled through execution of the programs, respective functions which suit predetermined purpose as will be described later can be realized. However, part or all of the functions may be realized with a hardware circuit such as an ASIC and an FPGA.

The communication unit 101 is a communication interface for wireless communication to be performed with other in-vehicle devices 100. Any communication scheme such as, for example, Wi-Fi (registered trademark), DSRC (Dedicated Short Range Communications), and millimeter-wave communication can be used as a communication scheme to be used by the communication unit 101 if wireless communication can be performed in a line-of-sight distance.

The control unit 102 (controller) is an arithmetic device which manages control to be performed by the in-vehicle device 100. The control unit 102 can be realized with an arithmetic processing unit such as a CPU.

The control unit 102 includes three functional modules of an own vehicle state acquiring unit 1021, an other vehicle state acquiring unit 1022, and a determining unit 1023. The respective functional modules may be realized by the stored programs being executed by a CPU.

The own vehicle state acquiring unit 1021 performs processing of acquiring speed and location information of the own vehicle, and processing of broadcasting the acquired information through wireless communication. Hereinafter, data including speed and location information of a specific vehicle will be referred to as a "vehicle state". Further, data in which the vehicle state is associated with an identifier of a vehicle or an in-vehicle device will be referred to as "vehicle state data". The generated vehicle state data is periodically broadcasted to the vicinity of the own vehicle. Further, the vehicle state of the own vehicle is stored in a storage unit 103 which will be described later.

The other vehicle state acquiring unit 1022 receives the vehicle state data broadcasted by the in-vehicle device 100 mounted on the other vehicle. The received vehicle state of the other vehicle is stored in the storage unit 103 which will be described later.

The determining unit 1023 determines whether or not road rage occurs between two vehicles on the basis of transition of the stored vehicle state of the own vehicle and transition of the vehicle state of the other vehicle and performs predetermined processing in a case where it is determined that road rage occurs.

The storage unit 103 includes a main memory and an auxiliary memory. The main memory is a memory to which a program to be executed by the control unit 102 and data to be utilized by the control program are to be deployed. The auxiliary memory is a device in which a program to be executed by the control unit 102 and data to be utilized by the control program are stored.

Figure 3A:
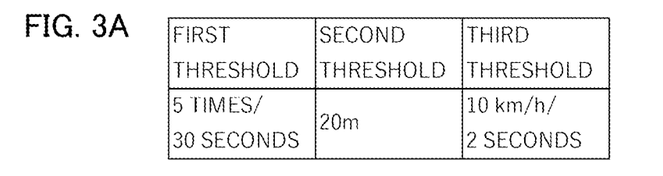
FIG. 3A is an example of data to be stored in a storage unit.
Figure 3B:
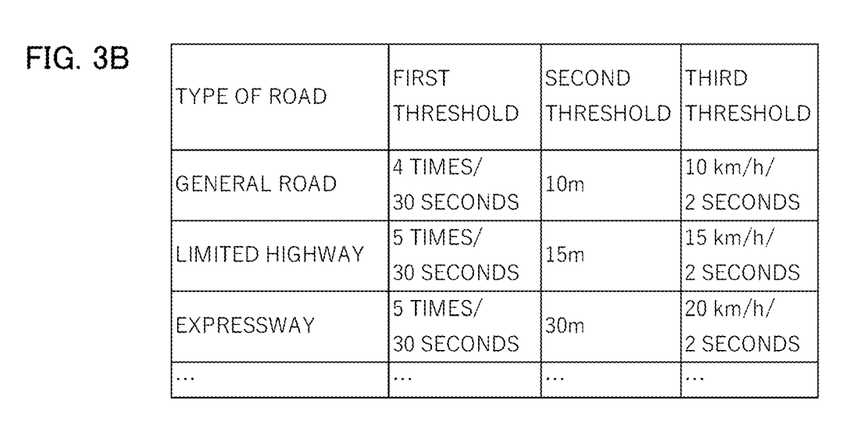
FIG. 3B is an example of data to be stored in a storage unit.

FIGS. 3A and 3B are examples of data to be stored in the storage unit. As the data, thresholds to be used for determination of road rage are stored. Details of respective values will be described later.

The input/output unit 104 is an interface for inputting/outputting information. The input/output unit 104 includes, for example, a display device and a touch panel. The input/output unit 104 may include a keyboard, a speaker, or the like.

A sensor group 105 includes one or more units for acquiring speed and location information of the own vehicle. The sensor group 105 includes, for example, a vehicle speed sensor, a GPS module, or the like. Data acquired by the sensor included in the sensor group 105 is transmitted to the control unit 102 (own vehicle state acquiring unit 1021) as needed.

Note that the sensor group 105 may include one or more unites for sensing other vehicles located in the vicinity of the own vehicle. Examples of such units can include, for example, a monocular camera, a stereo camera, a radar, a LIDAR, a laser scanner, or the like. While, in the present embodiment, the other vehicle state acquiring unit 1022 acquires the vehicle state of the other vehicle through wireless communication, the vehicle state of the other vehicle may be indirectly acquired by the sensor included in the sensor group 105.

Figure 4:
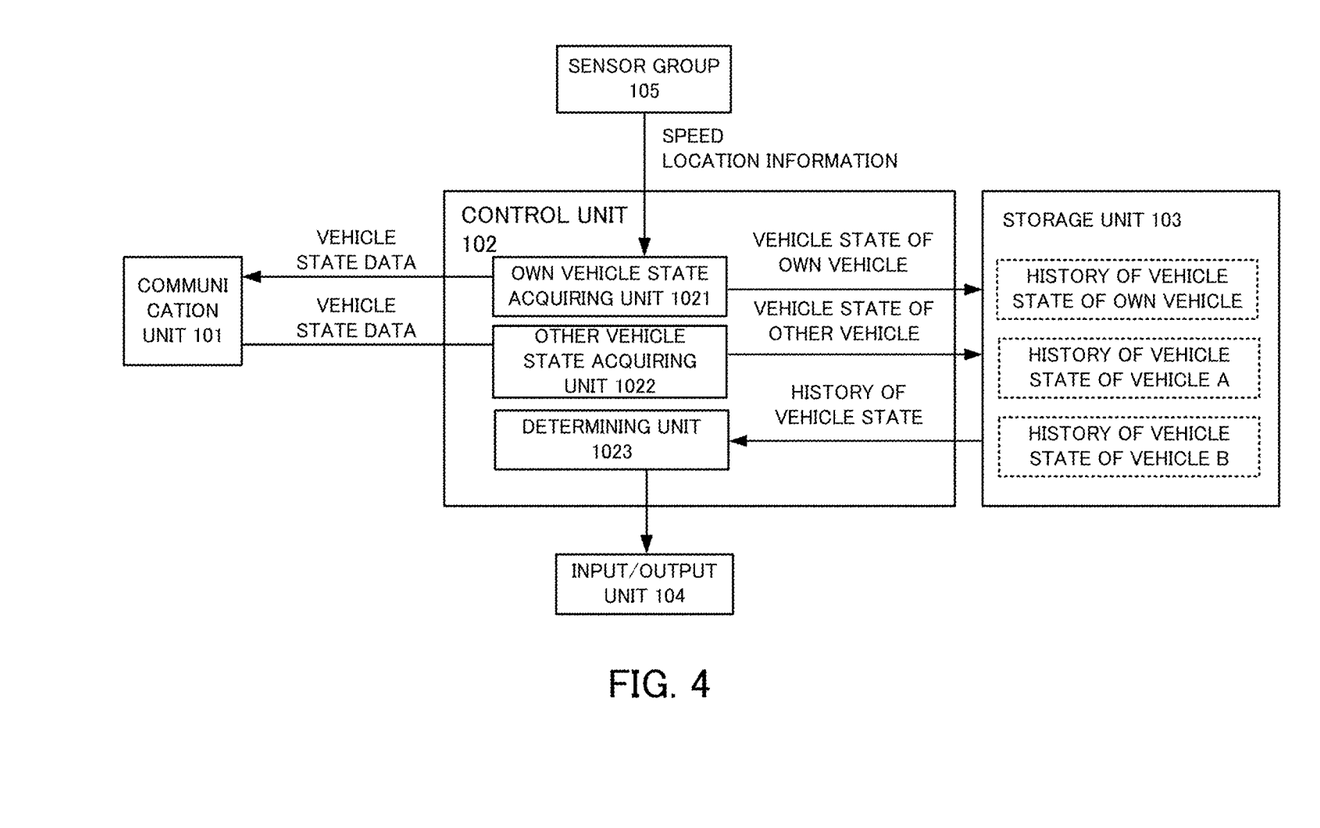
FIG. 4 is an example of data to be input/output to/from a control unit.

FIG. 4 is a diagram illustrating data to be input/output to/from the control unit 102.

The own vehicle state acquiring unit 1021 acquires speed and location information of the own vehicle from the sensor group 105 and generates vehicle state data. The generated vehicle state data is wirelessly broadcasted via the communication unit 101. Further, the vehicle state of the own vehicle is stored in the storage unit 103.

The other vehicle state acquiring unit 1022 receives vehicle state data broadcasted by the other vehicle via the communication unit 101 and stores the vehicle state data in the storage unit 103.

In the storage unit 103, history of the vehicle states of the own vehicle and the other vehicle is accumulated for each vehicle.

The determining unit 1023 acquires history of the vehicle state of the own vehicle and history of the vehicle state of the other vehicle from the storage unit 103 and determines whether or not road rage occurs on the basis of these pieces of data. In a case where the determining unit 1023 detects occurrence of road rage, predetermined processing is executed via the input/output unit 104.

A method for determining road rage by the determining unit 1023 will be described next.

The determining unit 1023 acquires history of the vehicle states for the own vehicle and one or more vehicles located in the vicinity of the own vehicle and generates data (hereinafter, time-series data) indicating change of speed and locations of the respective vehicles in chronological order. The time-series data is, for example, data indicating change of the speed and locations of the corresponding vehicles in a past predetermined period (for example, 30 seconds).

Figure 5A:
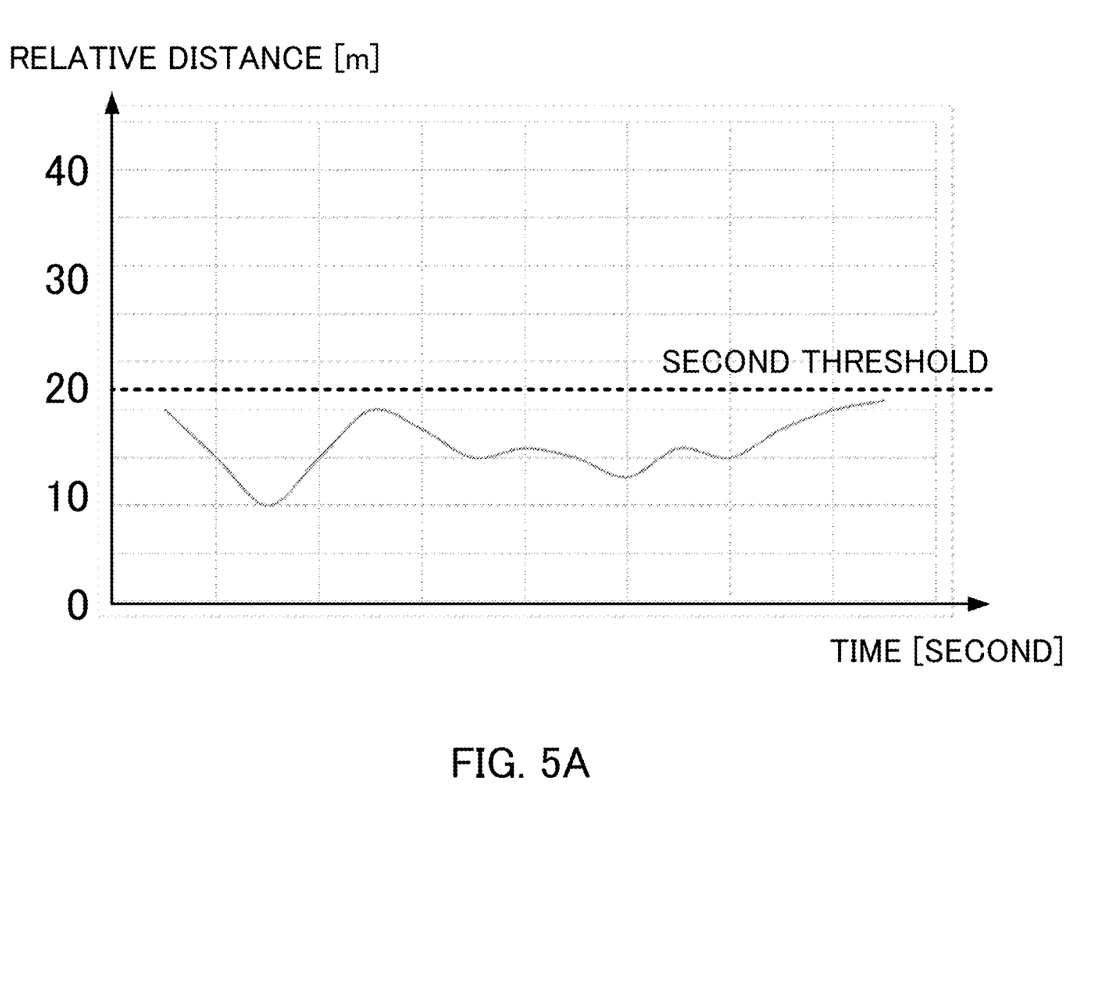
FIG. 5A is a diagram indicating a relative distance between two vehicles in chronological order.

Further, the determining unit 1023 generates a pair of the own vehicle and the other vehicle located in the vicinity of the own vehicle and calculates transition of a relative distance between the respective vehicles on the basis of time-series data of the two vehicles. FIG. 5A is a diagram illustrating transition of the relative distance in a past predetermined period (for example, 30 seconds). Note that while the relative distance in the present disclosure is typically a distance between the vehicles, the relative distance does not necessarily have to be a distance from a tail end of the preceding vehicle which travels in single file to a forefront portion of the subsequent vehicle. For example, the relative distance may be a distance between points which represent the vehicles. Further, the relative distance may be a distance between vehicles which are traveling side by side.

Figure 5B:
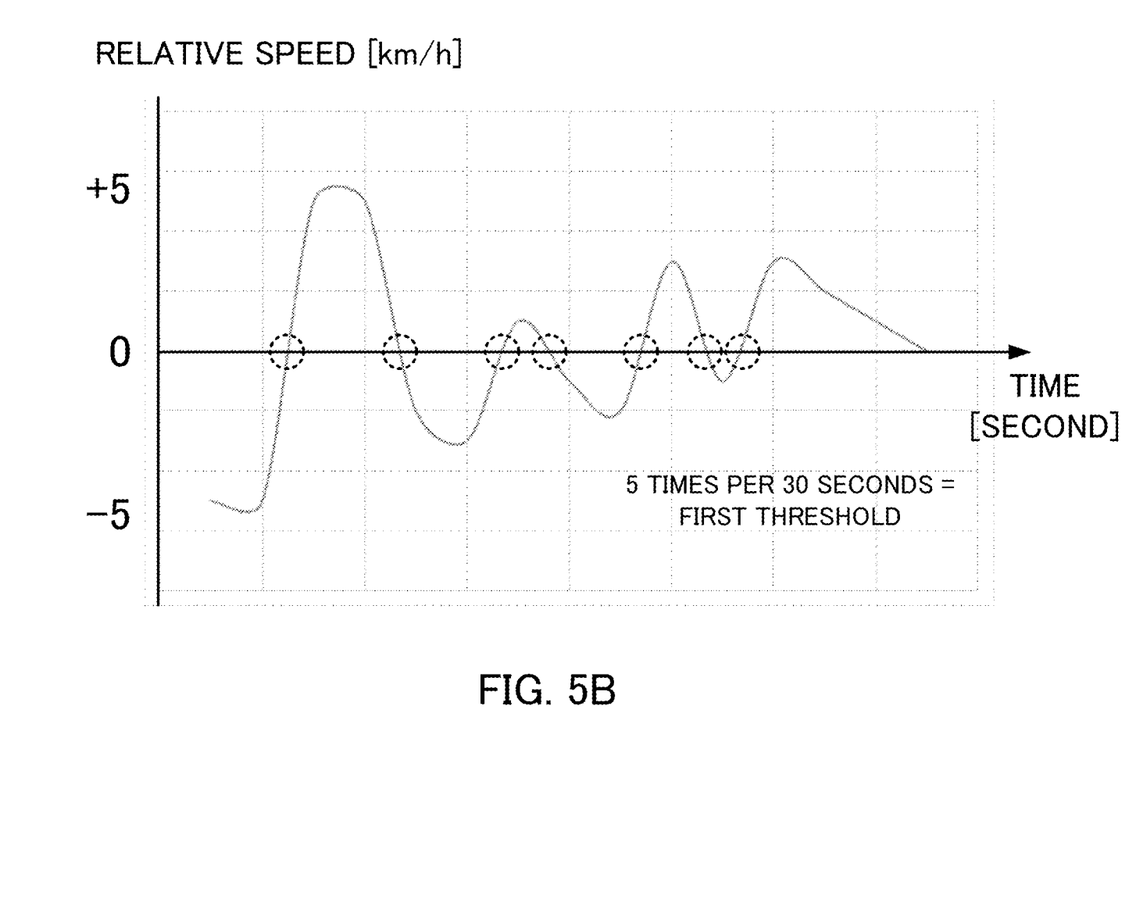
FIG. 5B is a diagram indicating relative speed between two vehicles in chronological order.

Further, the determining unit 1023 calculates transition of relative speed between the vehicles on the basis of the calculated transition of the relative distance. FIG. 5B is a diagram illustrating transition of the relative speed between the vehicles.

Here, in a case where a sign (polarity) of the relative speed between the vehicles is inverted the number of times equal to or larger than a predetermined number of times within a predetermined period, it can be estimated that one vehicle repeatedly approaches the other vehicle. Therefore, the determining unit 1023 calculates the number of times that the polarity is inverted within the predetermined period and compares the number of times with a first threshold. For example, in a case where the first threshold illustrated in FIG. 3A is used, in a case where the polarity sign is inverted the number of times exceeding five times within 30 seconds, it is determined that road rage occurs.

The determination will be referred to as first determination.

Figure 6A:
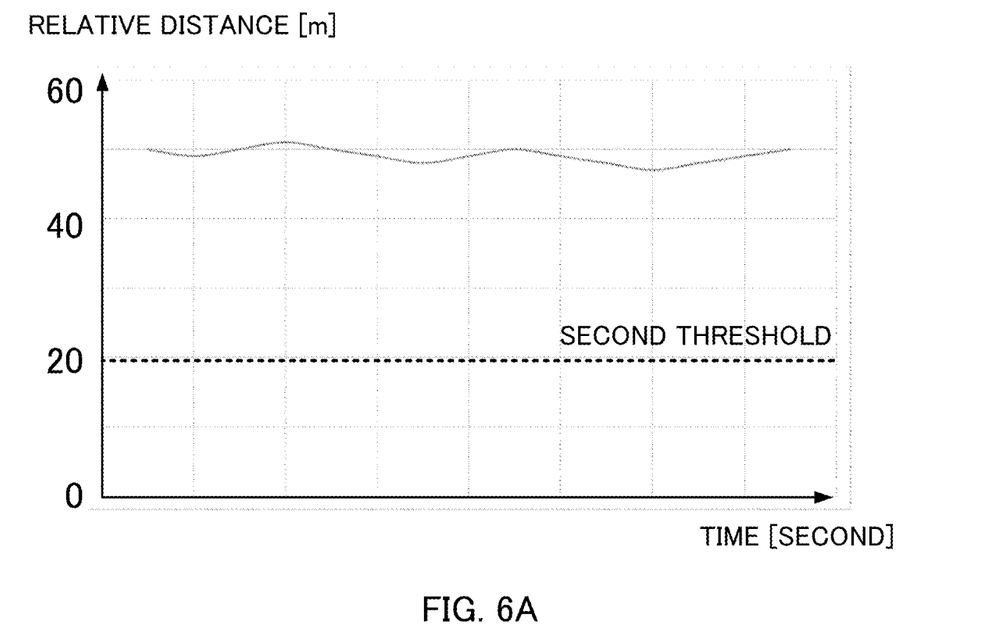
FIG. 6A is a diagram illustrating an example of a case which does not correspond to road rage.
Figure 6B:
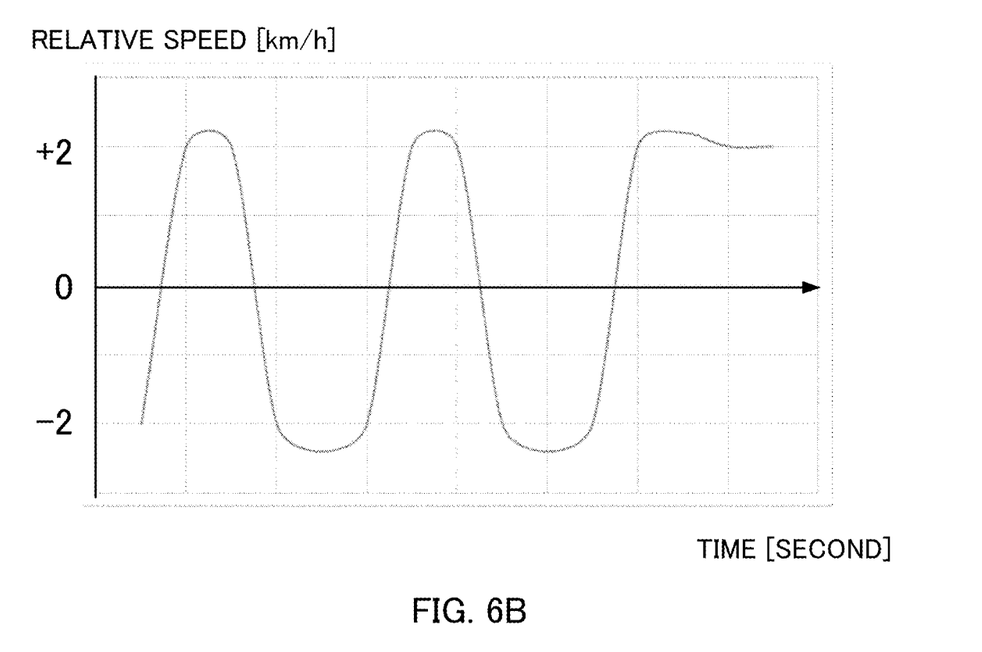
FIG. 6B is a diagram illustrating an example of a case which does not correspond to road rage.

Note that, even in a case where the polarity of the relative speed is inverted, in a case where a sufficient distance is kept between the vehicles, the action is not regarded as road rage. For example, in an example in FIGS. 6A and 6B, while the polarity of the relative speed is inverted five times, because a sufficient distance is kept between the vehicles, the action is determined as normal driving. A threshold for the distance to be used for the determination is a second threshold. For example, in a case where the second threshold illustrated in FIG. 3A is used, in a case where the relative distance between the vehicles is equal to or longer than 20 meters, determination of road rage is not performed.

Note that, in a case where speed of the target vehicle drastically changes, the determining unit 1023 determines that road rage has occurred without waiting for determination using the relative speed. Examples of such a case can include, for example, a case where a sudden braking action has occurred, or the like. That is, in a case where the relative distance is within the second threshold and change of the vehicle speed in the predetermined period exceeds a threshold, the determining unit 1023 determines that road rage has occurred. A threshold for acceleration to be used for the determination is a third threshold. For example, in a case where the third threshold illustrated in FIG. 3A is used, in a case where speed changes by equal to or greater than 10 km/h in two seconds, it is determined that road rage has occurred.

The determination will be referred to as second determination.

Figure 7:
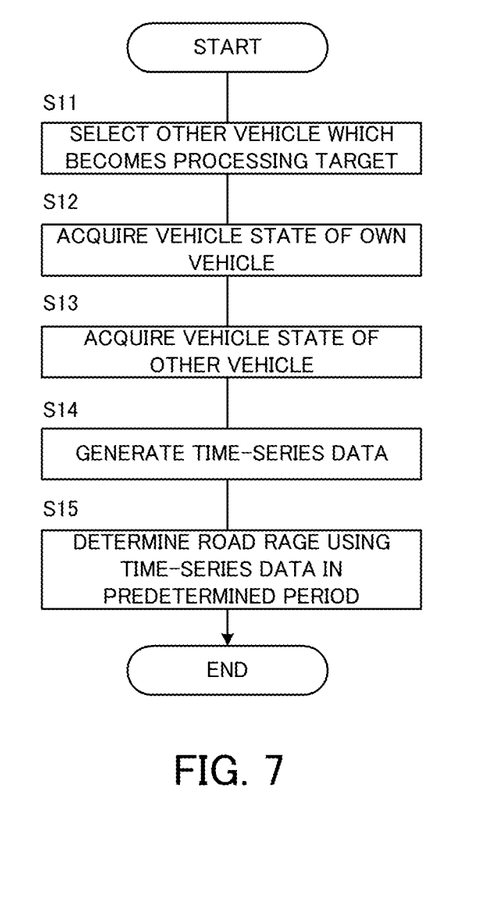
FIG. 7 is a flowchart of processing to be executed by the control unit.

A flowchart in which the in-vehicle device 100 (determining unit 1023) performs the processing described above will be described next with reference to FIG. 7.

The processing is executed at a timing at which the vehicle starts traveling. Separately from the illustrated processing, the control unit 102 periodically executes processing of acquiring vehicle states of the own vehicle and a vehicle located in the vicinity of the own vehicle and causing the vehicle states to be stored in the storage unit 103.

In step S11, the other vehicle which is a processing target is selected on the basis of the data stored in the storage unit 103. The other vehicle selected here is preferably a vehicle which satisfies the following conditions.

vehicle located within a predetermined range centering around the own vehicle vehicle which travels in the same direction as the own vehicle In step S12, history of the vehicle state of the own vehicle corresponding to a predetermined period (first period, for example, 30 seconds) is acquired.

Then, in step S13, history of a vehicle state of the other vehicle selected in step S11 corresponding to the predetermined period (first period) is acquired. In a case where a plurality of vehicles is selected in step S11, history of the vehicle states is respectively acquired for the plurality of vehicles.

Then, in step S14, time-series data is generated on the basis of the acquired history of the vehicle states. In the present step, time-series data of the relative distance is generated for each of the selected other vehicles. For example, in a case where vehicles A and B are selected as other vehicles, time-series data indicating a relative distance between the own vehicle and the vehicle A and time-series data indicating a relative distance between the own vehicle and the vehicle B are generated.

Further, time-series data indicating vehicle speed of the own vehicle is generated at the same time.

Figure 8:
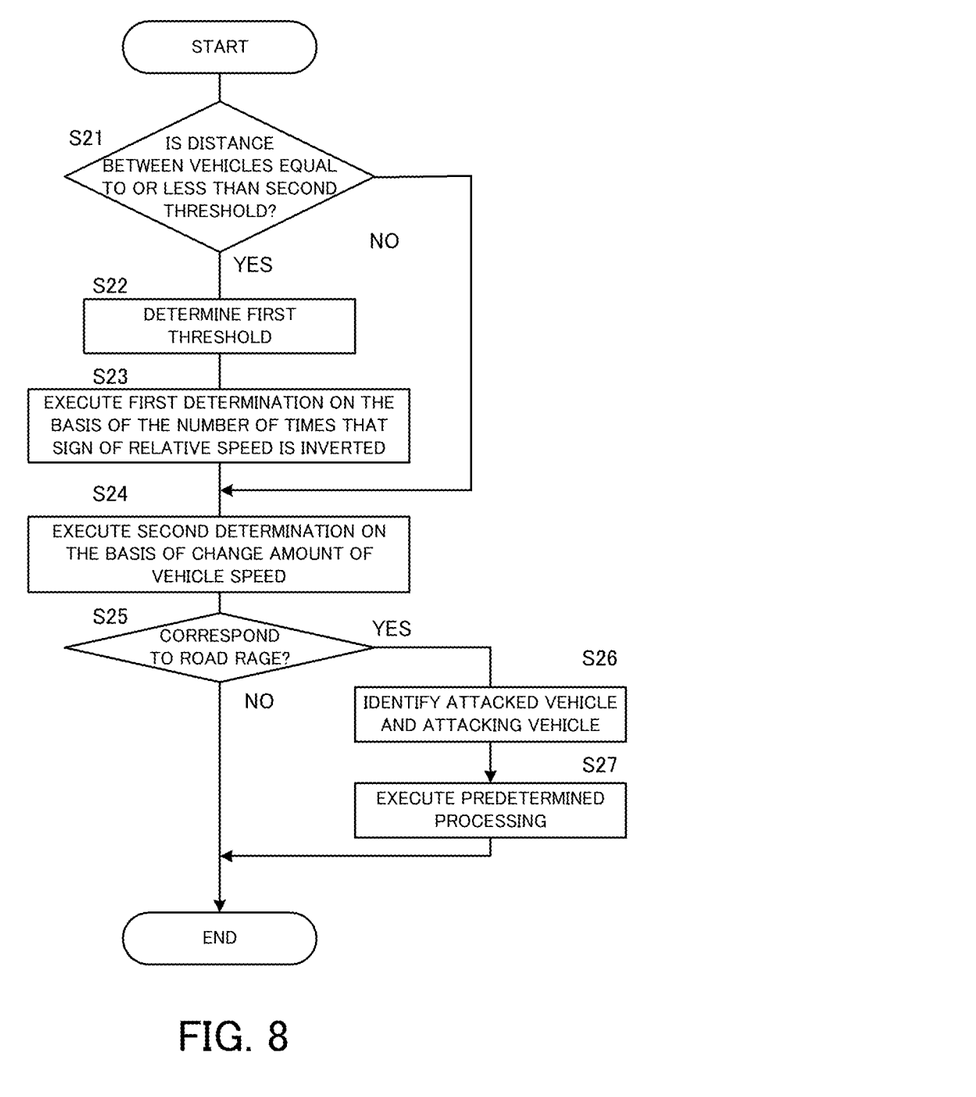
FIG. 8 is a flowchart of processing to be executed by the control unit.

Then, in step S15, whether or not road rage occurs is determined using the generated time-series data. FIG. 8 is a diagram explaining processing to be performed by the determining unit 1023 in step S15 in detail. The processing illustrated in FIG. 8 is executed for each of the other vehicles selected in step S11. Hereinafter, the other vehicle which is a processing target will be referred to as a target vehicle.

First, in step S21, it is determined whether or not a relative distance between the own vehicle and the target vehicle is equal to or less than the second threshold. Here, in a case where a positive result is obtained in the determination, the processing transitions to step S22. In a case where a negative result is obtained in the determination, the processing transitions to step S24.

In step S22, the first threshold is determined. In the present example, the first threshold stored in the storage unit 103 is acquired and utilized in the subsequent processing.

In step S23, the first determination is performed on the basis of the time-series data indicating a distance between the vehicles. In the first determination, it is determined whether or not the number of times that the polarity of the relative speed is inverted in the predetermined period (first period) exceeds the first threshold. Here, in a case where the number of times that the polarity of the relative speed is inverted in the predetermined period (first period) exceeds the first threshold, it is determined that road rage occurs.

Then, in step S24, the second determination is performed on the basis of the time-series data indicating vehicle speed. In the second determination, it is determined whether or not a change amount of the vehicle speed within the predetermined period (third period) exceeds the third threshold. Here, in a case where the change amount of the vehicle speed in the third period exceeds the third threshold, it is determined that road rage occurs.

In a case where it is determined that the action corresponds to road rage in at least one of the first determination and the second determination (step S25: Yes), the processing transitions to step S26.

In step S26, which of the own vehicle or the other vehicle is an attacking vehicle (that is, a vehicle which has performed road rage), and which of them is an attacked vehicle (a vehicle which has been subjected to road rage) is identified. In the present step, a maximum value and a minimum value of absolute speed within the predetermined period (second period) are acquired, and it is determined that a vehicle for which a difference between the maximum value and the minimum value is greater is the attacking vehicle, and a vehicle for which a difference is smaller is the attacked vehicle. Because the vehicle which is performing road rage has a feature that vehicle speed drastically changes in a short period of time, it is possible to estimate which of the two vehicles is performing road rage through the processing.

Note that the first to the third periods may be different from each other.

Note that while, in a case where road rage is performed from behind, it is possible to identify the attacking vehicle and the attacked vehicle using the method in step S26, in a case where traveling hindrance is performed from the front, there is a case where both vehicles largely reduce speed. In view of such a case, for example, in a case where differences between the maximum values and the minimum values of the absolute speed are similar, a vehicle which changes speed first may be determined as the attacking vehicle.

In step S27, different processing is executed in accordance with whether the own vehicle is an attacking vehicle or an attacked vehicle. For example, in a case where the own vehicle is an attacking vehicle, a notification to stop the dangerous action may be issued via the input/output unit 104. Further, in a case where the own vehicle is an attacked vehicle, support in a case where the vehicle is subjected to road rage may be provided via the input/output unit 104. Alternatively, evidence may be maintained using a dashboard camera, or the like, mounted on the vehicle. Further, in a case where communication service is available, it is also possible to connect a driver to an operator so as to get advice. Alternatively, it is also possible to inform the police agency, or the like.

As described above, according to the first embodiment, the in-vehicle device 100 can detect that the vehicle intentionally repeats approach to the other vehicle, so that it is possible to take appropriate measures in accordance with a situation.

(Second embodiment)

While, in the first embodiment, the first to the third thresholds are fixed, the respective thresholds may be varied in accordance with a traveling environment. For example, as illustrated in FIG. 3B, different sets of thresholds may be stored in accordance with a type of a road, and thresholds in accordance with a type of a road on which the own vehicle is traveling may be used in the processing in step S15. The type of the road on which the own vehicle is traveling may be determined on the basis of a result of sensing using the sensor group 105. For example, the type of the road on which the own vehicle is traveling may be determined by the acquired location information of the own vehicle being checked against road map data.

Further, the respective thresholds may be corrected in accordance with a speed range of the own vehicle. For example, in a case where the own vehicle is traveling at higher speed, the second threshold may be corrected to be greater, and, in a case where the own vehicle is traveling at lower speed, the second threshold may be corrected to be smaller.

Still further, the respective thresholds may be corrected on the basis of weather, brightness, or the like. For example, the second threshold may be corrected to be greater in a case of an environment in which more attention is required to drive, or in a case of an environment in which a difficulty level of driving is high, than in other cases.

(Third embodiment)

Further, the first threshold may be changed on the basis of positional relationship between the own vehicle and the other vehicle. For example, a level of danger becomes higher in a case where the vehicle approaches from a side (that is, in a case where it can be judged that the vehicle comes close from a side), than in a case where the vehicle approaches from behind. Therefore, the first threshold may be set smaller in a case where the vehicles are traveling side by side than in a case where two vehicles are traveling in single file.

(Modified examples)

The above-described embodiments are merely an example, and the present disclosure can be modified and implemented as appropriate within a range not deviating from the gist of the present disclosure.

For example, the processing and the units described in the present disclosure can be implemented while the processing and the units are freely combined unless technical inconsistency arises.

Further, while, in the description of the embodiments, a term of road rage has been used, a target to be detected by the information processing apparatus according to the present disclosure is not limited to road rage from behind. For example, the road rage includes coming close from a side, traveling hindrance of cutting in front of the vehicle, or the like.

Further, while, in the description of the embodiments, each vehicle broadcasts the vehicle state of the own vehicle, the vehicle states of other vehicles may be acquired using other than wireless communication. For example, it is also possible to track vehicles located in the vicinity of the own vehicle using a sensor or a camera and acquire speed information and location information for each identified vehicle. In this case, data of the corresponding vehicle may be deleted from the storage unit 103 after tracking is finished (including a case where the own vehicle loses sight of the vehicle and a case where the vehicle travels sufficiently away from the own vehicle).

Further, while, in the description of the embodiments, the predetermined processing has been performed only once in step S27, in a case where road rage is detected a plurality of times, other processing may be performed. For example, in a case where the processing in step S27 is executed the number of times equal to or larger than a predetermined number of times (for example, three times), a report may be filed.

Further, while description has been provided assuming that one apparatus performs operation, the operation may be shared and executed by a plurality of apparatuses. Alternatively, the processing which has been described as being performed by different apparatuses may be executed by one apparatus. In a computer system, it is possible to flexibly change what kind of hardware configurations (server configurations) implement the respective functions.

The present disclosure can be implemented by a computer program implementing the functions described in the above-described embodiments being supplied to a computer, and one or more processors of the computer reading out and executing the program. Such a computer program may be provided to the computer with a non-transitory computer-readable storage medium which can be connected to a system bus of the computer or may be provided to the computer via a network. The non-transitory computer-readable storage medium includes, for example, an arbitrary type of disk such as a magnetic disk (such as a floppy (registered trademark) disk and a hard disk drive (HDD)), and an optical disk (such as a CD-ROM, a DVD disk and a blu-ray disk), a read only memory (ROM), a random access memory (RAM), an EPROM, an EEPROM, a magnetic card, a flash memory, an optical card, and an arbitrary type of medium appropriate for storing an electronic command.

What is claimed is:

1. An information processing apparatus comprising:
a controller configured to execute:
periodically acquiring relative speed between two vehicles which are traveling on a same road; and
performing predetermined processing in a case where a number of times that a polarity of the relative speed is inverted in a first period exceeds a first threshold, wherein
the predetermined processing includes causing at least one of the two vehicles to switch from manual driving to autonomous driving in the case where the number of times that the polarity of the relative speed is inverted in the first period exceeds the first threshold,
the controller is configured to determine the first threshold on a basis of positional relationship between the two vehicles, and
the controller is configured to set the first threshold smaller in a case where the two vehicles are traveling side by side than in a case where the two vehicles are traveling in single file.

2. The information processing apparatus according to claim 1, wherein the controller is configured to:
acquire a relative distance between the two vehicles, and
perform the predetermined processing in a case where the relative distance falls below a second threshold.

3. The information processing apparatus according to claim 2, wherein the controller is configured to determine the second threshold on a basis of a traveling environment of the two vehicles.

4. The information processing apparatus according to claim 2, wherein the controller is configured to determine the second threshold on a basis of vehicle speed of the two vehicles.

5. The information processing apparatus according to claim 1, wherein the controller is configured to acquire a maximum value and a minimum value of vehicle speed in a second period for each of the two vehicles.

6. The information processing apparatus according to claim 5, wherein the controller is configured to determine that road rage is performed by a vehicle for which a difference between the maximum value and the minimum value is greater, with respect to the other vehicle.

7. The information processing apparatus according to claim 6, wherein the controller is configured to issue an alert to a driver of the vehicle which performs the road rage as the predetermined processing.

8. The information processing apparatus according to claim 1, wherein the controller is configured to perform the predetermined processing in a case where a change amount of vehicle speed in a third period exceeds a third threshold for one of the vehicles.

9. The information processing apparatus according to claim 1, wherein
the information processing apparatus is an apparatus mounted on one of the two vehicles, and
the controller is configured to calculate the relative speed on a basis of a result of sensing another vehicle located in a vicinity of an own vehicle.

10. The information processing apparatus according to claim 9, wherein the controller is configured to generate a plurality of pairs of the own vehicle and another vehicle and calculates the relative speed for each of the pairs.

11. The information processing apparatus according to claim 1, wherein the controller is configured to perform second processing on a basis of the number of times that the predetermined processing is performed.

12. An information processing method comprising:
periodically acquiring relative speed between two vehicles which are traveling on a same road;
performing predetermined processing in a case where a number of times that polarity of the relative speed is inverted in a first period exceeds a first threshold;
acquiring a maximum value and a minimum value of vehicle speed in a second period for each of the two vehicles; and
determining that road rage is performed by a vehicle for which a difference between the maximum value and the minimum value is greater, with respect to the other vehicle, wherein
the predetermined processing includes causing at least one of the two vehicles to switch from manual driving to autonomous driving in the case where the number of times that the polarity of the relative speed is inverted in the first period exceeds the first threshold.

13. The information processing method according to claim 12, further comprising:
acquiring a relative distance between the two vehicles, and
performing the predetermined processing in a case where the relative distance falls below a second threshold.

14. The information processing method according to claim 13, further comprising determining the second threshold on a basis of a traveling environment of the two vehicles.

15. The information processing method according to claim 13, further comprising determining the second threshold on a basis of vehicle speed of the two vehicles.

16. The information processing method according to claim 12, wherein
the information processing method is executed by an apparatus mounted on one of the two vehicles, and
the method includes calculating the relative speed on a basis of result of sensing another vehicle located in a vicinity of an own vehicle.

17. A non-transitory storage medium in which a program for causing a computer to execute the information processing method according to claim 12 is recorded.

* * * * *